Figure 1:
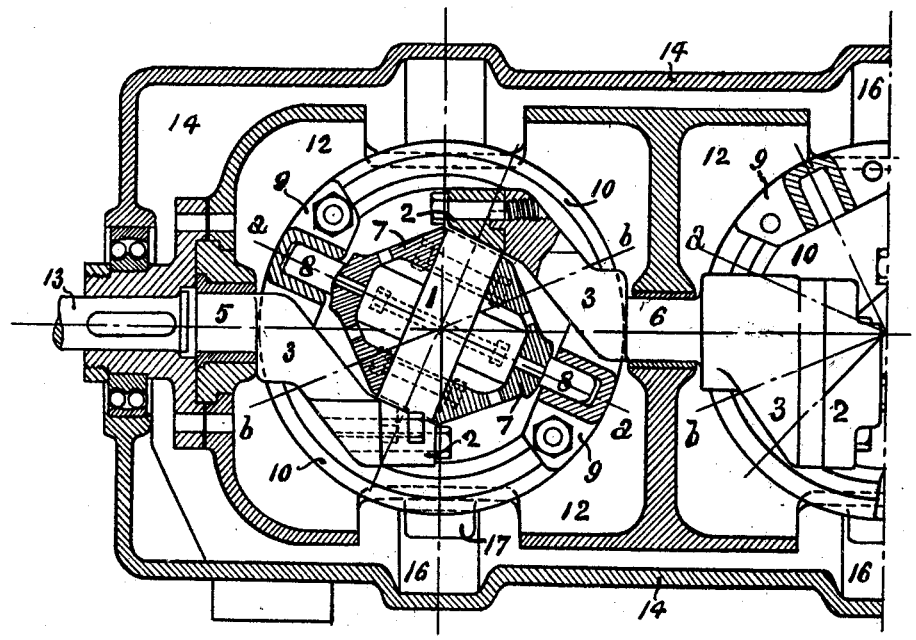
Figure 1:
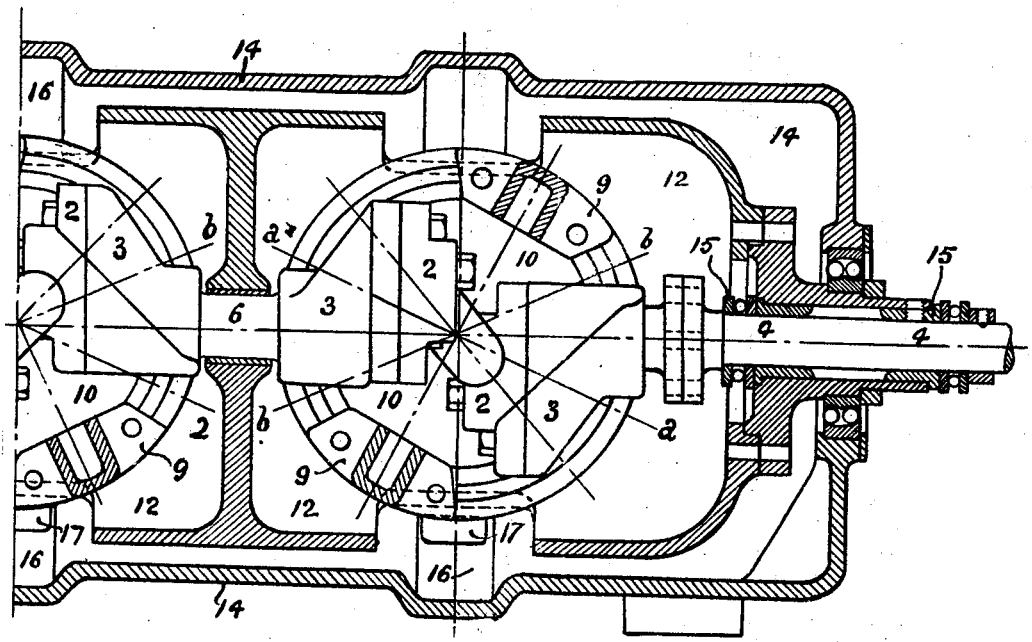

Sept. 8, 1931.  W. HUNT  1,822,776
ROTARY MECHANISM FOR THE TRANSMISSION OF POWER AT VARYING SPEEDS
Filed Oct. 11, 1922  2 Sheets-Sheet 1

INVENTOR:-
WILFRED HUNT
by his Attorneys
Howson and Howson

Sept. 8, 1931.  W. HUNT  1,822,776
ROTARY MECHANISM FOR THE TRANSMISSION OF POWER AT VARYING SPEEDS
Filed Oct. 11, 1922  2 Sheets-Sheet 2

INVENTOR:-
WILFRED HUNT
by his Attorneys
Howson and Howson

Patented Sept. 8, 1931

1,822,776

UNITED STATES PATENT OFFICE

WILFRED HUNT, OF GLASGOW, SCOTLAND

ROTARY MECHANISM FOR THE TRANSMISSION OF POWER AT VARYING SPEEDS

Application filed October 11, 1922, Serial No. 593,773, and in Great Britain November 16, 1921.

The invention relates to mechanical transformers—that is to say, rotary mechanisms for the transmission of power at varying speeds—of the type in which an inertia member is so interconnected between a primary and a secondary transmission member that it is caused to oscillate with constant amplitude but at a rate which is proportional to the difference between the speeds of the primary and secondary members. That is to say, mechanism of the type described in the specifications of my prior patents No. 1,127,251, No. 1,298,506 and No. 1,360,216.

It has already been established by me that in the construction of a mechanism of this kind, certain conditions must be observed, namely:—

(1) The alternate accelerations and retardations of the masses of the inertia member must be equal and opposite—anything in the nature of connecting rod obliquity must be absent from the interconnecting means.

(2) The axes about which the masses oscillate must be other than the axis of bodily rotation—preferably and for various considerations, these axes should be at right-angles to and cutting the axis of bodily rotation.

(3) To ensure continuity of action, the masses of the inertia member under most conditions must be so arranged that acceleration is at all times taking place in some part of that member.

Considering a unit of the inertia member as a mass oscillated about an axis and purely in one plane, and interconnected between the primary and secondary members by a mechanism which gives substantially the motion of a crank and a connecting-rod of unlimited length, acceleration of that mass takes place during the first quarter of the cycle of revolution, retardation during the second quarter, acceleration again but in the opposite sense during the third quarter and retardation during the fourth quarter. It is only during acceleration of the mass that reaction, tending to make the secondary member follow (that is, rotate with) the primary member, takes place.

With a crank-diagram ratio of the acceleration of the mass, the resistance of the mass varies throughout its acceleration period and reaches its maximum at substantially the middle of the period, that is in the first acceleration of the cycle when one-eighth of the total cycle has been performed or, looked upon as the rotation of a crank, when the crank has moved through 45°. This point occurs again when five-eighths of the cycle is reached and when the crank has moved through 225°.

Action and reaction in the mechanism are of course equal and opposite, and just as the mass resists being accelerated by the primary (and in resisting tends to cause the secondary to follow the primary) so does it during its retardation tend to assist the primary. Thus the energy which is put into the mechanism by the primary during acceleration of the mass is returned by the retarding decelerating mass to the primary.

In order that full advantage of this fact may be taken and in order that not only may the greatest load carrying-capacity be ensured but also that internal losses may be avoided and smoothness of operation be attained, the interconnecting mechanism between the units of the inertia member and the primary and secondary members is according to the present invention so devised that the leverage exerted by the primary member against a unit mass of the inertia member during the acceleration of that unit mass is as nearly as may be the same as the leverage exerted by the unit mass towards the primary member during retardation of the mass.

It has been found that the most effective type of mechanism of this class is that in which the inertia member consists of a series of flywheel-like units or elements oscillating on axes at right-angles to and cutting the axis of primary rotation, operated by zed-crank or by swash plate devices on the primary shaft and so set that their phases of acceleration overlap one another and provide a substantially constant turning moment, and while the present invention may be applied to mechanisms of other than this specific form in which the interconnecting means may be other than zed-cranks or swash-blocks, it is herein set forth as applied to that form of mechanism.

As a zed-crank device as applied in this mechanism is, in effect, a wedge of varying angle thrust—by the rotation of the primary member—between that member and the inertia unit which it operates, it follows that the necessary conditions will be fulfilled if the wedge or thrust effect is of substantially 45° at the point substantially of maximum resistance of the mass during acceleration and as between the primary and the mass, and is again a wedge effect of substantially 45° at the like point during retardation of the mass and as between the mass and the primary. This condition is substantially fulfilled when the zed-crank lies at an angle of the order of 20–30 degrees to the plane of rotation (or when an axis normal to the plane of a swash-block lies at this inclination its plane lying at 60–70 degrees) and when consequently the mass swings through an arc of the order of 130 to 140 degrees.

The invention further relates to an improved form of zed-crank device facilitating the attainment of the very considerable angle which is required.

Figure 2:
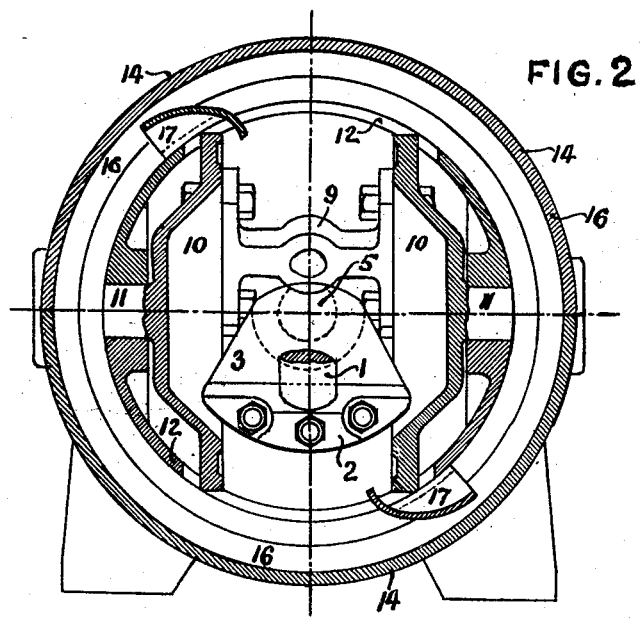

An example of the carrying out of the invention in this manner is shown on the accompanying sheets of explanatory drawings in which Fig. 1 is a longitudinal sectional elevation and Fig. 2 a transverse vertical section through the center of a unit.

In this example, three units set in successive and overlapping phase are used, and while it would be possible to construct in a single piece the necessary three-throw zed-crankshaft for operating them, it is considerably easier and more expedient to build up the crankshaft, consequently, in this example each zed-crank consists of a crank pin 1 having formed on its ends horns 2 by which it is located on and bolted to palm-pieces 3. The palm-piece at the driven end is coupled to a primary shaft 4 and at the end remote therefrom has formed on it a short tail shaft 5. The intermediate pairs of palm-pieces 3 are formed, each pair, in one piece connected by short shafts 6.

The pin 1 of each crank is engaged by a gudgeon piece 7 formed in halves and having on it at right-angles to the axis of the crank pin gudgeon pins 8 which engage bridge-pieces 9 connecting each pair of flywheels 10—gudgeons and pins only being shown in one unit.

The pairs of flywheels 10 straddle the built up zed-crankshaft and have formed on them trunnions 11 (Figure 2) which take bearing in a rotary case 12 which is divided in halves longitudinally and forms the secondary member. The case 12 has also formed in it bearings for the zed-crankshaft members 5, 6 and is, of course, bolted together. The case 12 is coupled at the left hand end to a secondary shaft 13 and the whole is supported in an outer stationary case 14 made in longitudinal halves. Zed-shaft and rotating case are free to accommodate themselves endwise under expansion, there being provided thrust washers 15 between the former and latter at one end only.

Shallow channels 16 are provided around the inner periphery of the stationary case 14 and oil gathering in these is distributed to the moving parts by scoops 17 which discharge it through apertures in the rotating case 12.

It will, of course, be understood that the three pairs of interconnected flywheels 10 operated by the three crankpins 1 constitute the three units requisite to obtain the most even turning moment. In this particular instance, the three pairs of flywheels lie in one plane and the three pins 1 are set at 60 degrees to one another so giving successive and overlapping phases of operation to the three units. It is apparent that the same result will be attained if the three crank pins be in line—that is, if they lie in the same longitudinal plane—and the three flywheels be set with their axes at 60 degrees to one another. In every case, of course, the axes of the flywheels cut and are at right-angles to the axis of bodily rotation.

With three inertia units thus arranged in succession there is practically complete regularity of both ingoing and outgoing torque, but under some conditions (for example, when minimum secondary speed is not less than that at which reasonable uniformity may be assured by the use of a rotary flywheel) and with sufficient rotary flywheel effect in the primary, two units or even one unit may be used.

As has been explained, the inertia units in this example are given, as indicated by the dotted lines a—a, b—b, Figure 1, an arc of oscillation of 135° in order that the conditions set forth may be attained; namely, that the mean wedge angle between the primary and an inertia unit during acceleration may be as nearly equal as may be to the mean angle between that unit and the primary during retardation. Since the effective stroke of a zed-crank is the swinging movement of the plane of rotation of the pin and not of the axis of the pin, the crank pins 1 lie at the complementary angle of 22½ degrees to the plane of rotation of the crank shaft. If instead of a zed-crank device a swash plate device were used, as the point of bearing is in the plane of the swash disc that would lie at 67½ degrees to the plane of rotation of the main or crank shaft.

While the zed-crank form of construction is to be preferred as being sturdier, giving better positioned bearings, and avoiding a certain rather heavy and alternating thrust in the direction of the axes of the flywheels given by a swash block, a swash block or other kindred device may be used. A swash block device is essentially a circular track lying at an angle to the axis about which it is rotated. Now, if we substitute a track which is not circular, a track which digresses from the plane in which a swash plate or block lies; in other words, a cam track, the condition of equal and opposite wedge action may be attained with an arc of oscillation which is other than of the order of 135 degrees—it simply depends on the angularity of different parts of the cam track. Again, devices quite other than zed-cranks or swash-blocks (cranks, links, levers or equivalent connections) may be used to attain the desired results with inertia units arranged in manners other than those set forth. Therefore, it is to be understood that the carrying out of this invention is in nowise limited to the specific means set forth. Where a zed-crank is mentioned in the claims the word should be understood to include any device of a type equivalent thereto.

What I claim is:—

1. A mechanical transformer having a primary member, a secondary member, and an inertia member having an inertia element, all so interconnected that the inertia element is caused to oscillate in accordance with differences in speed between the primary and secondary members, said transformer being provided with means for oscillating the inertia element, whereby the mean leverage exerted from the primary member towards the inertia element during the acceleration period of the latter's oscillation is substantially equal to the mean leverage exerted by the element towards the primary member during the retardation period of its oscillation.

2. Mechanism forming the subject matter of claim 1 hereof, provided with a zed crank having such relation to the axis of bodily rotation of the primary member that the angle between the instant planes described by the crank pin and the axis of bodily rotation at the beginning of the acceleration period of the inertia member's oscillation is of the order of 45 degrees, and that the angle between the instant planes described by said pin and axis at the mid-point of said period and corresponding angles at the beginning and mid-point of the retardation period are of the same order.

3. Power transmission mechanism having a primary member and a secondary member in combination with inertia means connecting said primary to said secondary, said means including a zed crank having an angle of less than 45° to a plane normal to the axis of the primary.

4. Mechanism forming the subject-matter of claim 1 hereof, provided with a zed-crank on the primary shaft having its pin at such an angle that oscillation through an arc of the order of 130 degrees to 140 degrees is caused.

5. A mechanical transformer having a primary member, a secondary member, and an inertia member mounted on the primary member between the primary and secondary members, said inertia member comprising inertia elements all so interconnected that the inertia elements are caused to oscillate in accordance with differences in speed between the primary and secondary members; the angle of mounting of said inertia elements being such as to give the inertia elements an arc of oscillation of the order of 130 to 140 degrees, substantially as described.

6. A mechanical transformer having a primary member, a secondary member, and an inertia member comprising inertia elements all so interconnected that the inertia elements are caused to oscillate in accordance with differences in speed between the primary and secondary member, said inertia member having a zed-crank whose pin lies at an angle of the order of 20–30 degrees to a plane normal to the axis of the primary member, substantially as described.

7. A mechanical transformer having a primary member, a secondary member, and an inertia member comprising inertia elements all so interconnected that the inertia elements are caused to oscillate in accordance with differences in speed between the primary and secondary members; said inertia member having a zed-crank pin, horns at the ends thereof, and opposed palms formed with shaft parts, said horns being adapted to position upon and be secured to the peripheries of the opposed palms, substantially as described.

8. Power transmission mechanism having a primary member, a secondary member and an inertia member in combination with means connecting said inertia member between said primary and secondary members with freedom of oscillation giving the geometrical effect of a connecting rod of unlimited length so set the midpoints of the acceleration and retardation periods of the inertia member's oscillation, that the angle between the instant planes described by the axis of bodily rotation of the primary member and the means connecting said inertia member at the beginning and at the midpoint of the acceleration period, and also the retardation period, is of the order of 45°.

9. A torque transmitter comprising a driving shaft, a driving pin affixed on and inclined to said shaft, a body rotatably mounted on said driving pin, a flywheel directly pivoted to said body, and a driven shaft pivoted to said flywheel.

10. A torque transmitter comprising a driving shaft, a driving pin affixed on and inclined to said shaft, a body constrained to rotary movement on said driving pin, a mass pivoted on and constrained to rotary movement with respect to said body, said mass being otherwise unconnected to said body, and a driven shaft directly pivoted to said mass.

11. A torque transmitter comprising a rotatable driving member having a cylindrical portion inclined with respect to the rotational axis of said member, a body rotatably mounted on said portion, an inertia member directly pivoted to said body, and a rotatable driven member pivoted to said inertia member.

12. A torque transmitter comprising a driving member having two cylindrical portions the axis of which are inclined to each other, a mounting confining said member to rotation about one of said axis, a body mounted on a cylindrical portion for rotation about the other of said axis, an inertia member pivoted on said body, and a driven member pivoted to said inertia member.

13. A torque transmitter comprising a driving member, a driven member, said members being in alinement for rotation about a common axis, a body mounted on said driving member for rotation about an axis inclined to the axis of rotation of said driving member, and an inertia member directly pivoted to said body and to said driven member.

In testimony whereof I have signed my name to this specification.

WILFRED HUNT.